G. H. HAMMOND.
Heating Drum.
No. 62,627.  Patented March 5, 1867.
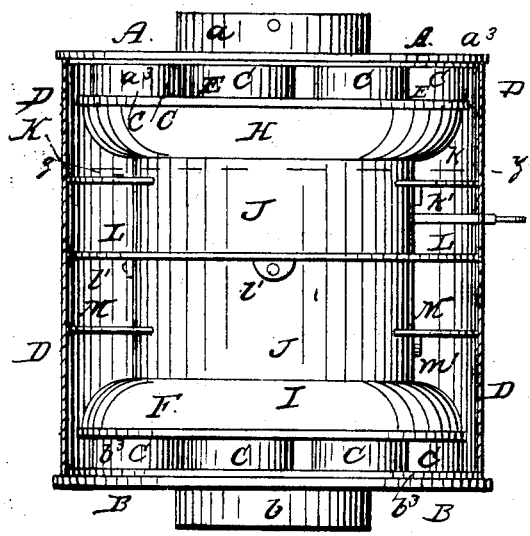
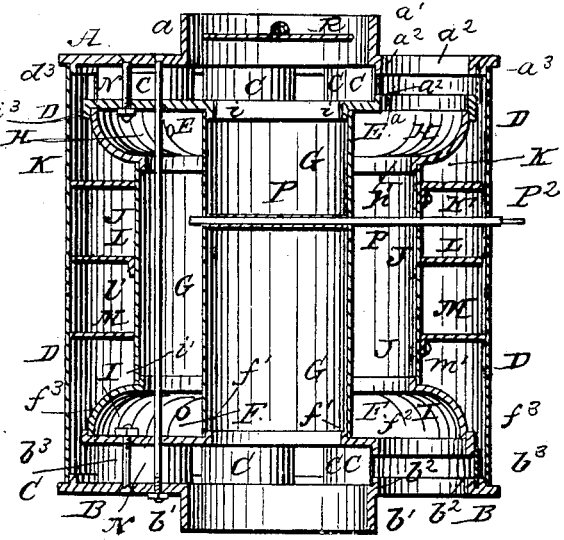
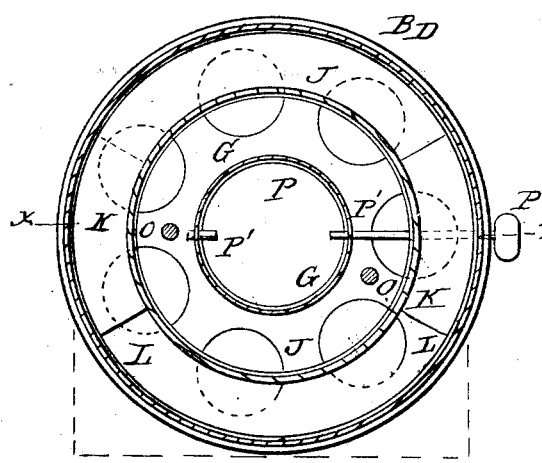
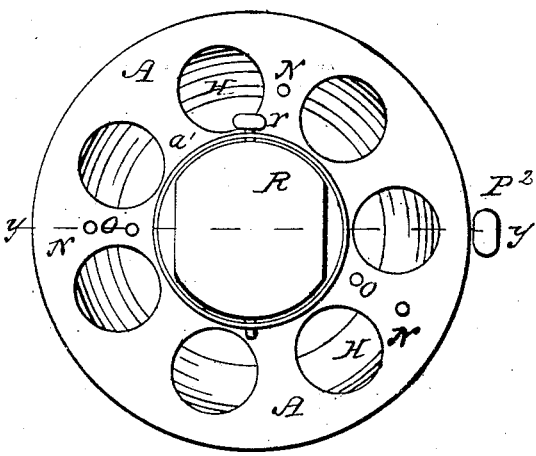
Witnesses
F. A. Jackson
Wm Irwin
Inventor
Geo H Hammond

United States Patent Office.

GEORGE H. HAMMOND, OF ONEONTA, NEW YORK.

Letters Patent No. 62,627, dated March 5, 1867.

---

IMPROVED STOVE-PIPE DRUM.

---

The Schedule referred to in these Letters Patent and making part of the same.

---

TO ALL WHOM IT MAY CONCERN:

Be it known that I, GEORGE H. HAMMOND, of Oneonta, Otsego county, and State of New York, have invented a new and improved Heat Extractor or Stove-Pipe Drum; and I do hereby declare that the following is a full, clear, and exact description thereof, which will enable others skilled in the art to make and use the same, reference being had to the accompanying drawing, forming part of this specification, in which—

Figure 1 is a side view of my improved heat extractor, part of the outer cylinder being cut away through the line $x\,x$, fig. 3.

Figure 2 is a vertical longitudinal central section of the same, taken through the line $y\,y$, fig. 4.

Figure 3 is a horizontal cross-section of the same, taken through the line $z\,z$, fig. 1.

Figure 4 is a top view of the same.

Similar letters of reference indicate like parts.

My invention has for its object to furnish an improved apparatus for extracting the heat from the smoke and other products of combustion passing off through the stove pipe, and which would otherwise be lost; and it consists, first, in the construction, combination, and arrangement of the disks with each other, with the interior, intermediate, and exterior cylinders, and with the short air pipes, as hereinafter more fully described; and second, in the combination of a damper, constructed as hereinafter described, with the upper disk of the heat extractor.

A and B are the upper and lower end disks of the heat extractor. These disks are made with holes through their centres, provided with outwardly projecting flanges $a^1$ and $b^1$, by means of which they are connected with the draught or smoke pipe of the stove. The disks A and B are also made with seven other holes through them, having inwardly projecting flanges $a^2$ and $b^2$, by means of which the short pipes C are connected to them, as shown in figs. 1 and 2. The disks A and B are also made with inwardly projecting flanges $a^3$ and $b^3$ around their outer edges, by means of which they are connected to the outer cylinder D. The disks E and F are made with holes through their centres, somewhat smaller than the central holes through the disks A and B, and having inwardly projecting flanges $e^1$ and $f^1$, by means of which they are connected to the interior cylinder G, as shown in fig. 2. The disks E and F are also made with seven other holes through them, corresponding in size and position to the holes through the disks A and B, and having outwardly projecting flanges $e^2$ and $f^2$, by means of which they are connected to the short pipes C. They are also made with inwardly projecting flanges $e^3$ and $f^3$ around their outer edges, by means of which they are connected to the edges of the disks H and I, as shown in fig. 2. The disks H and I are made concave on their outer sides and convex on their inner sides, as shown in fig. 2, and have holes through their centres, through which the interior cylinder G passes, and having inward flanges $h^1$ and $i^1$, by means of which they are connected to the intermediate cylinder J, as shown in fig. 2. K, L, and M are disks, of such a size as to fill the space between the cylinders D and J, and which have ears or flanges $k^1$, $l^1$, $m^1$ formed upon their inner edges, by means of which they are riveted to the cylinder J, as shown in figs. 1 and 2. From one-quarter to one-third of these disks K L M is cut away, as shown in figs. 1 and 3, and they are so arranged that their ends may overlap each other, as shown in dotted lines in fig. 3. The disks K L M are represented in the drawings as being three in number, but more may be used if desired, the number to be used depending upon the size of the apparatus. The disks A and E and the disks B and F are held together by the rods and nuts N, and the entire apparatus is held together by the rods and nuts O. P is a damper attached to a rod $p^1$, by means of which it is pivoted to the cylinder G. One end of the rod $p^1$ is extended so as to pass out through the cylinders J and D, and which terminates in a handle, $p^2$, by means of which the damper is operated. The damper P should be of such a size that when turned into a horizontal position it will entirely stop the draught through the cylinder G. R is a damper, pivoted to the flange $a^1$ of the disk A, one end of the pivoting-rod terminating in a handle, $r$, by means of which the said damper is operated. The wings of the damper R are cut off, as shown in fig. 4, so that the damper may be turned into a horizontal position and almost entirely check the escape of the heat, and yet allow a sufficient draught to the stove to prevent the escape of smoke or gas into the room.

In using the apparatus the damper P is turned into a horizontal position. This prevents the smoke from passing off through the cylinder G, and it is compelled to pass through the spaces between the short pipes C, between the disks B and F, and around the edges of the disks F and I into the space between the cylinders D and J. As it rises in said space it encounters the disk M, along the under side of which it passes until it reaches the opening through the said disk, through which it rises to the disk L, upon striking which it divides into two currents which pass around in opposite directions to the opening through said disk, and so on till it reaches the disk H, over the edge of which it rises into the space between the disks E and A and the pipes C, and thence into the stove pipe. The cold air enters through the holes in the disk B, passes through the space between the disks F and I, through the space between the cylinders D and J, through the space between the disks H and E, and through the pipes C into the room, being through all its course in contact with surfaces very much heated by checking the direct ascent of the heat and smoke, and thus almost wholly extracting the heat from the smoke and gases escaping through the chimney.

I claim as new, and desire to secure by Letters Patent—

The construction, combination, and arrangement of the disks A E H K L M I F B with each other, with the interior, intermediate, and exterior cylinders G J D, and with the short pipes C, substantially as described and for the purpose set forth.

GEORGE H. HAMMOND.

Witnesses:
 JOSEPH SHOOK,
 LESTER WESTON.